(12) United States Patent
Tang

(10) Patent No.: US 11,965,905 B2
(45) Date of Patent: Apr. 23, 2024

(54) ELECTRONIC MODULE INCLUDING OPTICAL MOTION SENSOR

(71) Applicant: Advanced Semiconductor Engineering, Inc., Kaohsiung (TW)

(72) Inventor: Shih-Chieh Tang, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 170 days.

(21) Appl. No.: 17/559,943

(22) Filed: Dec. 22, 2021

(65) Prior Publication Data

US 2023/0194807 A1 Jun. 22, 2023

(51) Int. Cl.
*G01P 15/093* (2006.01)
*G01H 9/00* (2006.01)
*G02B 6/42* (2006.01)

(52) U.S. Cl.
CPC ........... *G01P 15/093* (2013.01); *G01H 9/006* (2013.01); *G02B 6/4246* (2013.01)

(58) Field of Classification Search
CPC ...... G01P 15/093; G01H 9/004; G01H 9/006; G02B 6/28; G02B 6/293; G02B 6/29331; G02B 6/29332; G02B 6/29335; G02B 6/29338; G02B 6/29341
USPC ............................................. 73/514.26, 653
See application file for complete search history.

(56) References Cited

U.S. PATENT DOCUMENTS

| | | | | |
|---|---|---|---|---|
| 4,353,259 A | * | 10/1982 | Schneider, Jr. | ....... G01P 15/093 73/514.39 |
| 4,477,732 A | * | 10/1984 | Mausner | ............... G01P 15/093 280/727 |
| 4,493,212 A | * | 1/1985 | Nelson | .................. G01P 15/093 250/231.19 |
| 5,291,014 A | * | 3/1994 | Brede | ..................... B60R 21/01 250/227.21 |
| 5,589,933 A | * | 12/1996 | Osgood | .................. G02B 6/353 359/227 |
| 5,787,212 A | * | 7/1998 | Hong | ..................... G01G 3/125 250/227.27 |
| 5,926,591 A | * | 7/1999 | Labeye | .................. G01H 9/006 385/25 |

(Continued)

FOREIGN PATENT DOCUMENTS

JP 10-162698 A * 6/1998
WO WO 2022/208090 A1 * 10/2022

OTHER PUBLICATIONS

B. Dong et al. An on-chip opto-mechanical accelerometer. 2013 IEEE 26th International Conference on Micro Electro Mechanical Systems (MEMS), pp. 641-644, Mar. 7, 2013, https://doi.org/10.1109/MEMSYS.2013.6474323. (Year: 2013).*

(Continued)

*Primary Examiner* — Michael Stahl
(74) *Attorney, Agent, or Firm* — FOLEY & LARDNER LLP

(57) ABSTRACT

An electronic module is provided. The electronic module includes a carrier, a movable component and an optical component. The movable component is on the carrier and configured to be movable with respect to the carrier. The optical component is configured to detect a movement of the movable component by an optical coupling between the optical component and the movable component.

7 Claims, 7 Drawing Sheets

(56) References Cited

U.S. PATENT DOCUMENTS

| | | | | |
|---|---|---|---|---|
| 6,236,778 B1* | 5/2001 | Laughlin | ............ | H04Q 11/0005 |
| | | | | 385/24 |
| 6,259,655 B1* | 7/2001 | Witort | ................. | G04G 9/0064 |
| | | | | 368/223 |
| 2003/0206693 A1* | 11/2003 | Tapalian | ............... | G01P 15/093 |
| | | | | 385/28 |
| 2005/0180678 A1* | 8/2005 | Panepucci | .............. | G01D 5/268 |
| | | | | 385/13 |
| 2009/0196543 A1* | 8/2009 | Lagakos | ............. | G02B 6/3514 |
| | | | | 385/12 |
| 2014/0283601 A1* | 9/2014 | Bhave | ................... | G01B 11/14 |
| | | | | 73/504.12 |
| 2016/0195397 A1* | 7/2016 | Bramhavar | ........ | G01D 5/35374 |
| | | | | 73/514.26 |
| 2016/0320180 A1* | 11/2016 | Lodden | ................ | G01B 11/272 |
| 2016/0349283 A1* | 12/2016 | Bramhavar | .......... | H03H 3/0073 |
| 2018/0031393 A1* | 2/2018 | Okamoto | ............... | G01B 11/26 |
| 2021/0255213 A1* | 8/2021 | Otugen | ................ | G01P 15/093 |

OTHER PUBLICATIONS

A. Shotorban et al. Optical MEMS accelerometer sensor relying on a micro-ring resonator and an elliptical disk. IET Circuits, Devices & Systems, 13:7, pp. 1102-1106, Oct. 22, 2019, https://doi.org/10.1049/iet-cds.2019.0029. (Year: 2019).*

* cited by examiner

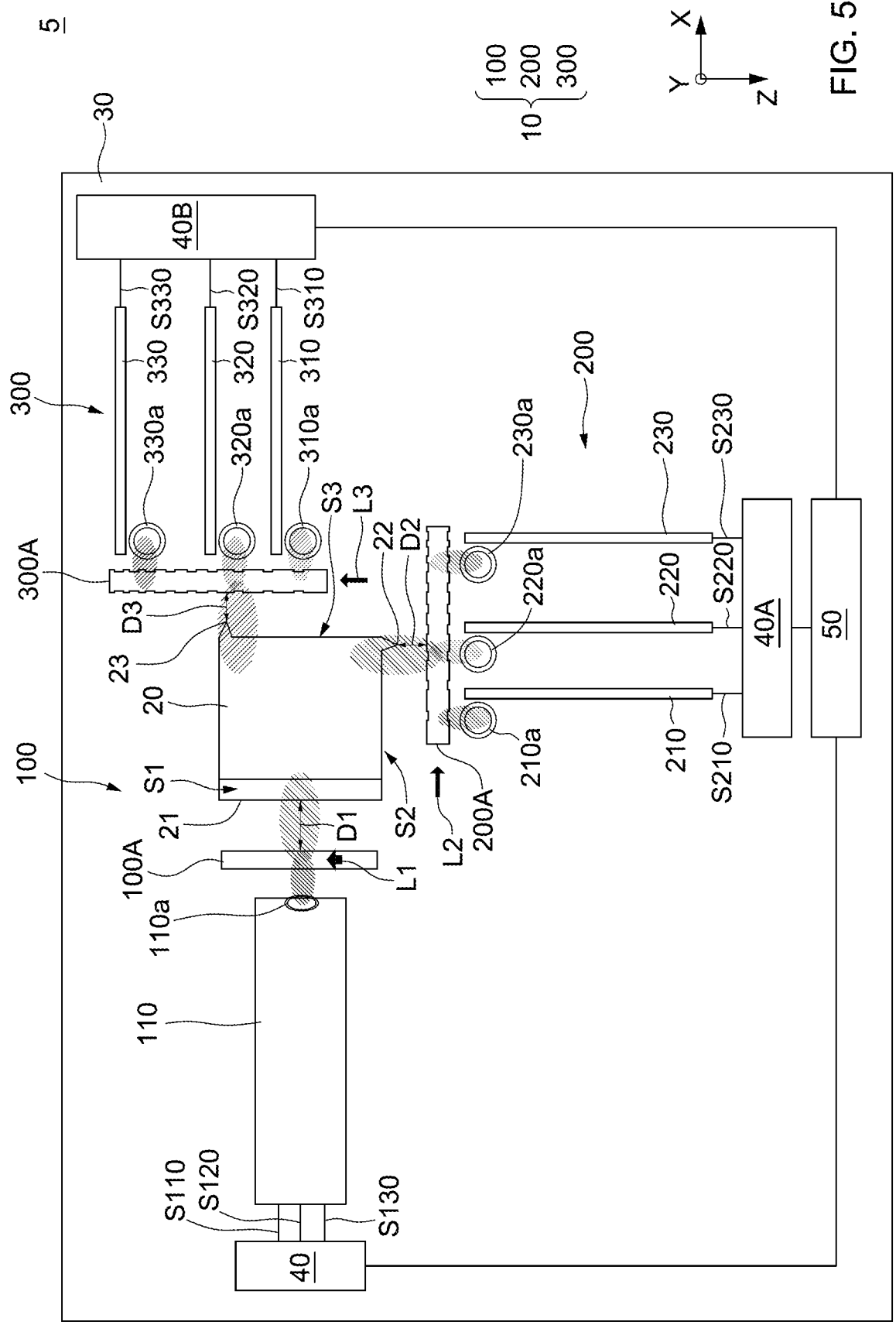

ELECTRONIC MODULE INCLUDING OPTICAL MOTION SENSOR

BACKGROUND

1. Technical Field

The present disclosure relates generally to an electronic module.

2. Description of the Related Art

Currently, accelerometers or g-sensor MEMS devices have adopted mechanical structural designs to convert inertial motion of a mass block into output electrical signals. As technology advances, micro-opto-electro-mechanical-system (MOEMS) devices have been broadly integrated into various devices, for example, mobile communication products such as smartphones. The MOEMS device normally includes optical structures for detecting optical signals in response to, for example, angular rotational velocity and acceleration. While the MOEMS devices feature high detection resolution, application of the MOEMS devices is limited by relatively small dynamic ranges.

SUMMARY

In some arrangements, an electronic module includes a carrier, a movable component and, an optical component. The movable component is on the carrier and configured to be movable with respect to the carrier. The optical component is configured to detect a movement of the movable component by an optical coupling between the optical component and the movable component.

In some arrangements, an electronic module includes a movable component, a plurality of waveguides, and an optical bus. The plurality of waveguides are disposed adjacent to the movable component. The optical bus is between the plurality of waveguides and the movable component. The optical bus is configured to couple a light to the movable component when the movable component is separated from the optical bus by a predetermined distance.

In some arrangements, an electronic module includes a movable component, a first plurality of waveguides, and a first optical bus. The movable component is attached to a carrier and configured to be movable with respect to the carrier. The first plurality of waveguides are disposed adjacent to a first side of the movable component. The first optical bus is configured to couple a first light to the movable component when the first side of the movable component is separated from the first optical bus by a first predetermined distance.

BRIEF DESCRIPTION OF THE DRAWINGS

Aspects of the present disclosure are best understood from the following detailed description when read with the accompanying drawings. It is noted that various features may not be drawn to scale, and the dimensions of the various features may be arbitrarily increased or reduced for clarity of discussion.

FIG. 5 is a schematic diagram of an electronic module in accordance with some arrangements of the present disclosure.

Common reference numerals are used throughout the drawings and the detailed description to indicate the same or similar elements. The present disclosure will be more apparent from the following detailed description taken in conjunction with the accompanying drawings.

DETAILED DESCRIPTION

Figure 1:
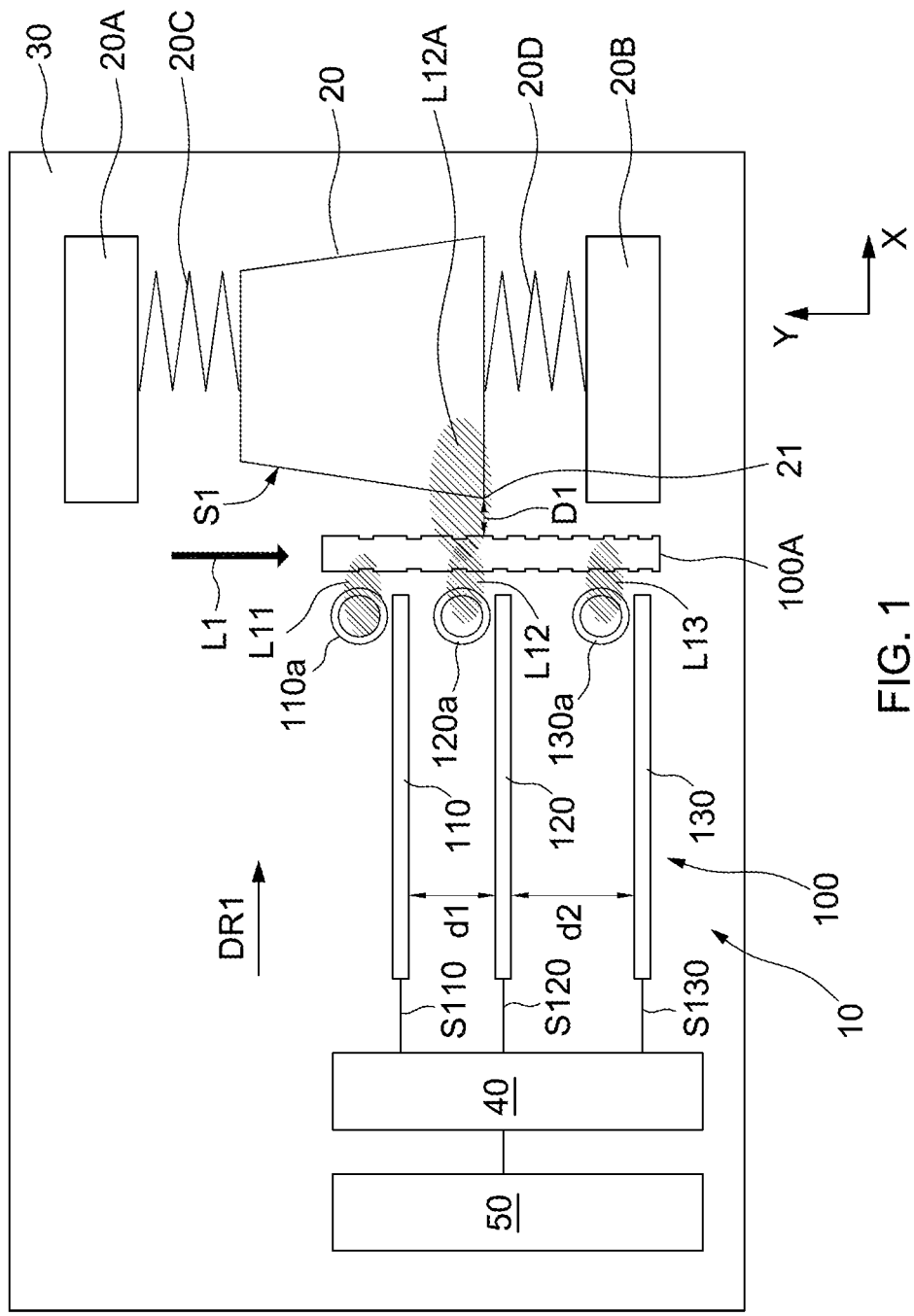
FIG. 1 is a schematic diagram of an electronic module in accordance with some arrangements of the present disclosure.

FIG. 1 is a schematic diagram of an electronic module 1 in accordance with some arrangements of the present disclosure. The electronic module 1 includes an optical module 10, a movable component 20, a carrier 30, a receiving unit 40, and a processing unit 50.

In some arrangements, the electronic module 1 may be or include a sensing module or a detection module. In some arrangements, the electronic module 1 may be configured to detect angular rotational velocity and acceleration. In some arrangements, the electronic module 1 may be configured to maintain a reference direction or provide stability in navigation, stabilizers, and other elements.

In some arrangements, the optical module 10 includes an optical component 100. In some arrangements, the optical component 100 is configured to detect a movement of the movable component 20 by an optical coupling between the optical component 100 and the movable component 20. In some arrangements, the optical component 100 is configured to indicate the movement of the movable component 20 via an optical index. The optical index may include one or more optical signals generated from one or more optical couplings between the optical component 100 and the movable component 20. The optical index may include a combination of intensities of two or more optical signals generated from optical couplings between the optical component 100 and the movable component 20.

In some arrangements, the optical component 100 is configured to split a light L1 into multiple light beams by, for example, the optical coupling between the optical component 100 and the movable component 20. In some arrangements, the optical component 100 is configured to detect a change in light intensity generated by the movement of the movable component 20.

The optical component 100 may receive the light L1 from one or more light sources (not shown in drawings). In some arrangements, the light source may be physically spaced apart from the carrier 30. In some other arrangements, the light source may be disposed over the carrier 30. In some arrangements, the light source may include a lighting element or a lighting device that is configured to generate one or more light beams. In some arrangements, the light source may be configured to generate light beams having a plurality of different frequencies, such as a beam of visible light, a beam of white light, a beam of infrared (IR) light, a beam of ultraviolet (UV) light, and so on. In some arrangements, the light source may be configured to generate a monochromatic light beam having one single frequency. For example, the light source may be configured to generate a laser beam or a light beam having a spectral linewidth of nearly zero. In that regard, in some arrangements, the light source may be a laser source.

In some arrangements, the optical component 100 includes an optical bus 100A, a plurality of waveguides (e.g., waveguides 110, 120, and 130), and a plurality of optical couplers (e.g., optical couplers 110a, 120a and 130a). In some embodiments, the optical couplers may be or include micro-ring resonators. It should be noted that the number of the waveguides and the number of the optical couplers of the optical component 100 may vary according to actual application, and the present disclosure is not limited thereto.

In some arrangements, the optical bus 100A is disposed between the movable component 20 and the waveguides 110, 120, and 130. In some arrangements, an extending direction or an extending orientation (e.g., Y axis) of the optical bus 100A is substantially perpendicular to an extending direction or an extending orientation (e.g., X axis or a direction DR1) of the waveguides 110, 120, and 130. In some arrangements, the optical bus 100A is disposed adjacent to a side S1 (or a lateral surface) of the movable component 20. In some arrangements, the optical bus 100A is fixed with respect to the carrier 30. In some arrangements, the optical bus 100A is configured to transmit the light L1. In some arrangements, the optical bus 100A is configured to couple the light L1 to the movable component 20 when the movable component 20 is separated from the optical bus 100A by a predetermined distance D1. The predetermined distance D1 may be determined according to the wavelength of the light L1 coupling to the movable component 20. The optical bus 100A may be designed according to the wavelengths or the ranges of wavelengths of the light L1 so as to increase the optical coupling efficiency. In some arrangements, the optical bus 100A may be a waveguide including a grating structure. For example, the optical bus 100A may include a grating structure having predetermined widths, various pitches one different regions, and/or one or more predetermined materials. For example, the grating structure of the optical bus 100A may be designed to modify the refractive index of the optical bus 100A and/or the k value of the light L1 so as to increase the optical coupling efficiency.

In some arrangements, the waveguides 110, 120, and 130 are disposed adjacent to the movable component 20. In some arrangements, the waveguides 110, 120, and 130 are disposed adjacent to the side S1 (or the lateral surface) of the movable component 20. In some arrangements, the waveguides 110, 120, and 130 are fixed with respect to the carrier 30. In some arrangements, the waveguides 110, 120, and 130 are arranged sequentially substantially parallel (e.g., Y axis) to a moving direction (e.g., Y axis) of the movable component 20.

In some arrangements, the waveguide 110 is configured to couple the light L1 transmitted in the optical component 100. In some arrangements, the waveguide 110 is configured to couple the light L1 transmitted in the optical bus 100A. In some arrangements, the waveguide 110 is configured to couple a portion (e.g., by an optical coupling L11) of the light L1 of a wavelength $\lambda 1$ from the optical bus 100A. For example, the waveguide 110 may be configured to couple a light beam of a wavelength $\lambda 1$ (also referred to as "a first light" or "a first light beam").

In some arrangements, the waveguide 120 is disposed adjacent to the waveguide 110. In some arrangements, the waveguide 120 is configured to couple the light L1 transmitted in the optical component 100. In some arrangements, the waveguide 120 is configured to couple the light L1 transmitted in the optical bus 100A. In some arrangements, the waveguide 120 is configured to couple a portion (e.g., by an optical coupling L12) of the light L1 of a wavelength $\lambda 2$, which is different from the wavelength $\lambda 1$, from the optical bus 100A. For example, the waveguide 120 may be configured to couple a light beam of a wavelength $\lambda 2$ (also referred to as "a second light" or "a second light beam"). In some arrangements, the waveguides 110 and 120 are configured to couple light beams of different wavelengths (also referred to as "the first light" and "the second light").

In some arrangements, the waveguide 130 is disposed adjacent to the waveguide 120. In some arrangements, the waveguide 130 is configured to couple the light L1 transmitted in the optical component 100. In some arrangements, the waveguide 130 is configured to couple the light L1 transmitted in the optical bus 100A. In some arrangements, the waveguide 130 is configured to couple a portion (e.g., by an optical coupling L13) of the light L1 of a wavelength $\lambda 3$, which is different from the wavelength $\lambda 1$ and the wavelength $\lambda 2$, from the optical bus 100A. For example, the waveguide 130 may be configured to couple a light beam of a wavelength $\lambda 3$ (also referred to as "a third light" or "a third light beam"). In some arrangements, the waveguides 110, 120, and 130 are configured to couple light beams of different wavelengths (also referred to as "the first light," "the second light," and "the third light").

In some arrangements, the optical couplers 110a, 120a and 130a are disposed between the optical bus 100A and the waveguides 110, 120, and 130. In some arrangements, each of the optical couplers 110a, 120a and 130a is disposed between each of the waveguides 110, 120, and 130 and the optical bus 100A. For example, the optical coupler 110a may be disposed between the optical bus 100A and the waveguides 110, the optical coupler 120a may be disposed between the optical bus 100A and the waveguides 120, and the optical coupler 130a may be disposed between the optical bus 100A and the waveguides 130. In some arrangements, the light L1 is a broadband light, and the optical couplers 110a, 120a and 130a are configured to allow light beams of different wavelengths to be transmitted to different waveguides 110, 120, and 130. In some arrangements, each of the optical couplers 110a, 120a and 130a is configured to allow a light beam of a predetermined wavelength to be transmitted to each of the corresponding waveguides 110, 120, and 130. For example, the optical coupler 110a may be configured to allow a light beam of a wavelength $\lambda 1$ to be transmitted to the waveguide 110, the optical coupler 120a may be configured to allow a light beam of a wavelength $\lambda 2$ to be transmitted to the waveguide 120, and the optical coupler 130a may be configured to allow a light beam of a wavelength $\lambda 3$ to be transmitted to the waveguide 130. In some arrangements, a distance d1 between the waveguide 110 and the waveguide 120 is different from a distance d2 between the waveguide 120 and the waveguide 130. In some arrangements, the optical couplers 110a, 120, and 130a may be or include micro-ring resonators.

In some arrangements, the movable component 20 is disposed on the carrier 30. In some arrangements, the movable component 20 is attached to the carrier 30. In some arrangements, the movable component 20 is configured to be movable with respect to the carrier 30. n some arrangements, the movable component 20 is configured to be movable with respect to the waveguides 110, 120, and 130. In some arrangements, the waveguides are arranged corresponding to or covering a moving range of the movable component 20. In some arrangements, at least one anchor (e.g., anchors 20A and 20B) may be fixed to the carrier 30. In some arrangements, at least one resilient member (e.g., resilient members 20C and 20D) may be connected to the at least one anchor (e.g., anchors 20A and 20B). In some arrangements, the movable component 20 may be connected to the least one resilient member (e.g., resilient members 20C and 20D). For example, the movable component 20 may be movably attached to the anchors 20A and 20B through the resilient members 20C and 20D. In some arrangements, the movable component 20 is an inertia block. In some arrangements, the movable component 20 does not include a light-transmitting element, e.g., a waveguide. In some arrangements, the resilient members 20C and 20D include springs.

In some arrangements, the optical component 100 is configured to split the light L1 into light beams respectively targeting the movable component 20 and the waveguide 110. In some arrangements, the optical component 100 is configured to split the light L1 into light beams respectively targeting the movable component 20 and the waveguide 110 by the optical coupling (e.g., by the optical couplings L12A and L12). In some arrangements, the light L1 is split into two light beams respectively targeting the movable component 20 and the waveguide 110 respectively by the optical couplings L12A and L12 when the movable component 20 is moved until the movable component 20 reaches a position where the movable component 20 is separated from the optical bus 100A by the predetermined distance D1. The predetermined distance D1 that may result in the optical coupling L12A between the movable component 20 and the optical bus 100A may be determined by the predetermined wavelength of the light beam that couples the movable component 20.

The light L1 transmitted in the optical bus 100A may couple to all of the waveguides 110, 120, and 130. Optical signals S110, S120 and S130 may be generated by the optical couplings L11, L12 and L13 and transmitted from the waveguides 110, 120, and 130 to the receiving unit 40. In some arrangements, the optical signals S110, S120 and S130 may have different wavelengths. In some arrangements, when the movable component 20 is moved, e.g., by inertia, until reaching a position where the movable component 20 is separated from the optical bus 100A by the predetermined distance D1, an evanescent field may be generated between the movable component 20 and the optical bus 100A so as to couple the light L1 to the movable component 20. For example, as shown in FIG. 1, when an evanescent field is generated and a portion (or a light beam) of the light L1 couples to the movable component 20 by the optical coupling L12A, another portion (or another light beam) of the light L1 at about the same position that couples the waveguide 120 by the optical coupling L12 may have a reduced intensity compared to configurations lacking the optical coupling L12A. Thus, the intensity of the optical signal S120 generated from the optical coupling L12 may be less than the intensities of the optical signals (e.g., the optical signals S110 and S130) generated from the optical couplings (e.g., the optical couplings L11 and L13) where no evanescent field is generated. As such, the movement or acceleration of the movable component 20 can be detected by the optical signals (e.g., the optical signals S110, S120 and S130) generated from the optical couplings (e.g., the optical couplings L11, L12, and L13) between the waveguides and the optical bus 100A.

The movable component 20 may influence the optical couplings between different waveguides and the optical bus 100A in turns as the movable component 20 moves. For example, as shown in FIG. 1, when the movable component 20 is moved to a location corresponding to the waveguide 110 and separated from the optical bus 100A by the predetermined distance D1, the optical coupling between the movable component 20 and the optical bus 100A at the location corresponding to the waveguide 110 may increase significantly, and the optical coupling efficiency between the movable component 20 and the optical bus 100A at the location corresponding to the waveguide 120 may be substantially zero. The optical signal S110 generated from the optical coupling L11 between the waveguide 110 and the optical bus 100A may have a reduced intensity, while the intensity of the optical signal S120 generated from the optical coupling L12 between the waveguide 120 and the optical bus 100A remains substantially unchanged. Then, the movable component 20 may continue moving to the location corresponding to the waveguide 120 and separated from the optical bus 100A by the predetermined distance D1. The optical coupling L12 between the movable component 20 and the optical bus 100A at the location corresponding to the waveguide 120 may increase significantly, resulting in a reduced intensity of the optical signal S120 generated from the optical coupling L12 between the waveguide 120 and the optical bus 100A, and the optical coupling between the movable component 20 and the optical bus 100A at the location corresponding to the waveguide 110 may be reduced. As the movable component 20 continues moving, the optical couplings L11, L12 and L3 between the waveguides 110, 120, and 130 and the optical base 100A may change accordingly. As such, the movement or acceleration of the movable component 20 can be detected by changes in the optical couplings L11, L12 and L3 between the waveguides 110, 120, and 130 and the optical base 100A. As the movable component 20 continues moving, the intensities of the optical signals S110, S120 and S130 generated from the optical couplings L11, L12 and L3 between the waveguides 110, 120, and 130 and the optical base 100A may change accordingly. As such, the movement or acceleration of the movable component 20 can be detected by the change in intensities (or light intensities) of the optical signals S110, S120 and S130 generated from the optical couplings between the waveguides and the optical bus 100A. A characteristic pattern based on the optical signals S110, S120 and S130 may be generated for indicating the movement or acceleration of the movable component 20. In some arrangements, the optical index for the optical component 100 to indicate the movement of the movable component 20 may include a combination of the optical signals S110, S120 and S130 generated from the optical couplings between the waveguides and the optical bus 100A. In some arrangements, the optical index may include a combination of various intensities of the optical signals S110, S120 and S130 generated from optical couplings between the waveguides and the movable component 20. In some arrangements, the optical index may be or include the characteristic pattern based on the optical signals S110, S120 and S130.

In some comparative embodiments, a MOEMS may include a Fabry-Perot cavity, and the movement or acceleration of a proof mass may be detected by detecting spectral shifts according to changes in the length of the Fabry-Perot cavity; however, the Fabry-Perot cavity has a limited dynamic range. In some other comparative embodiments, while a MOEMS may include waveguides formed of photonic crystals for detecting the movement of a proof mass, the movement of the proof mass needs to be controlled to maintain the photonic crystal lattice constant within a certain range to ensure detection linearity. In contrast, in some arrangements, the optical component 100 may include twenty waveguides, thirty waveguides, or even more according to actual application. In some arrangements, the number of the waveguides may vary according to the desired dynamic range (or the desired detection range), and thus the dynamic range of the electronic module 1 is unlimited. For example, the dynamic range may be increased to exceed 500 g or even 1000 g, and thus the applications of the electronic module 1 as a g-sensor can be broadened. In addition, the distances between adjacent waveguides may vary according to the desired sensing resolution, and thus the sensing resolution of the electronic module 1 may be significantly increased.

When an evanescent field is generated at a location of the optical bus 100A, the light L1 at the location is shared by the optical couplings between the optical bus 100A and the waveguides and the optical coupling between the optical bus 100A and the movable component 20. When the optical coupling between the movable component 20 and the optical bus 100A covers a relatively large range, e.g., corresponding to an area covering more than three waveguides, the optical signals generated by the optical couplings and transmitted from these waveguides may have relatively low intensities, because the movable component 20 couples a relatively large amount of the light L1 and leaves a relatively small amount of the light L1 to the waveguides. In some arrangements, the optical coupling between the movable component 20 and the optical bus 100A covers a range corresponding to three or less than three waveguides. Therefore, the optical coupling between the movable component 20 and the optical bus 100A shares a relatively small amount of the light L1, and thus the optical signals generated by the optical couplings and transmitted from the waveguides can still share a relatively large amount of the light L1 and thus have relatively high intensities. Therefore, since the optical signals are provided with sufficient intensity, a satisfactory resolution can be provided.

In some arrangements, the movable component 20 includes an optical-component-proximal portion 21 on the side S1 facing the optical bus 100A. The optical-component-proximal portion 21 may be or include a tapered portion or a predetermined tapered portion. The optical-component-proximal portion 21 may protrude from the side S1 (or the lateral surface) of the movable component 20. In some arrangements, the optical-component-proximal portion 21 is configured to couple the light L1 transmitted in the optical component 100. For example, the optical-component-proximal portion 21 may be configured to couple the light L1 transmitted in the optical bus 100A. In some arrangements, the optical-component-proximal portion 21 is separated from optical bus 100A by the predetermined distance D1. In some arrangements, the waveguides are arranged corresponding to or covering a moving range of the optical-component-proximal portion 21 of the movable component 20.

In some arrangements, the light L1 is split into two light beams respectively targeting the movable component 20 and the waveguide 110 by the optical couplings L12A and L12 when the movable component 20 is moved until the optical-component-proximal portion 21 of the movable component 20 reaches a position in which the optical-component-proximal portion 21 is separated from the optical bus 100A by the predetermined distance D1. An evanescent field may be generated between the optical-component-proximal portion 21 and the optical bus 100A so as to couple a light beam of the light L1 to the optical-component-proximal portion 21 of the movable component 20. In some arrangements, since the optical-component-proximal portion 21 of the movable component 20 couples the light L1 covering a relatively small range corresponding to the waveguides, e.g., three or less waveguides, the optical signals generated by the optical couplings and transmitted from the waveguides can have relatively high intensities, and the resolution can be improved. In addition, the optical-component-proximal portion 21 protrudes from the side S1 (or the lateral surface) of the movable component 20 and thereby creates a relatively large difference in the distance from the optical-component-proximal portion 21 to the optical bus 100A and the distance from the side S1 (or the lateral surface) to the optical buss 100A. Since the generation of an evanescent field is relatively highly sensitive to the predetermined distance D1, this relatively large difference can result in relatively high resolution of the optical signals S110, S120 and S130, and thus a signal-to-noise (S/N) ratio can be increased.

In some arrangements, the optical bus 100A includes an apodized grating. The apodized grating may tweak the optical coupling between the optical bus 100A and the movable component 20 to obtain optical quality factor for the optical signals S110, S120, and S130.

In some arrangements, the carrier 30 may include a silicon material. In some arrangements, the carrier 30 may include a Silicon on Insulator (SOI) substrate including a silicon substrate, an oxide layer disposed on the silicon substrate, and a silicon layer disposed on the oxide layer. In some arrangements, the carrier 30 may include a silicon photonics substrate or a material platform from which optical devices and/or photonic integrated circuits can be made. In some arrangements, the carrier 30 may be a light distributing device configured to direct light beams among the optical devices. In some arrangements, one or more of the optical bus 100A and the waveguides 110, 120, and 130 may be fabricated in the silicon layer of the carrier 30. For example, the carrier 30 may include a silicon base and a silicon oxide layer disposed on the silicon base, and the waveguides 110, 120, and 130 may be formed in the silicon oxide layer. In some arrangements, the waveguides 110, 120, and 130 may include a patterned silicon layer. In some arrangements, the waveguides 110, 120, and 130 may include a plurality of patterned layers on different areas, locations, or layers in the silicon oxide layer. The carrier 30 may further include another silicon oxide layer disposed on the silicon oxide layer. In some arrangements, the refractive index of the waveguides 110, 120, and 130 may be different from the refractive index of the silicon oxide layers. Light beams may be trapped or confined in the waveguides 110, 120, and 130. In some arrangements, light beams may travel through the waveguides 110, 120, and 130, to a boundary between the waveguides 110, 120, and 130 and the silicon oxide layers, and bounce between the waveguides 110, 120, and 130 and the silicon oxide layers at the boundary thereof. In some arrangements, the carrier 30 may include a carrier in or on which one or more of the optical bus 100A and the waveguides 110, 120, and 130 may be disposed.

The receiving unit 40 may be configured to receive optical signals S110, S120 and S130 from the waveguides 110, 120, and 130. The receiving unit 40 may be configured to receive optical signals S110, S120 and S130 generated from the optical couplings L11, L12 and L13 between the waveguides 110, 120, and 130 and the light bus 100A.

The processing unit 50 may be connected to the receiving unit 40. In some arrangements, the processing unit 50 is configured to generate a characteristic pattern based on the optical signals S110, S120 and S130 of the waveguides 110, 120, and 130. In some arrangements, the characteristic pattern may include a combination of the optical signals S110, S120 and S130 having various wavelengths and various intensities resulting from the optical coupling between the movable component 20 and the optical component 100. In some arrangements, the characteristic pattern indicates the movement of the movable component 20.

Figure 2:
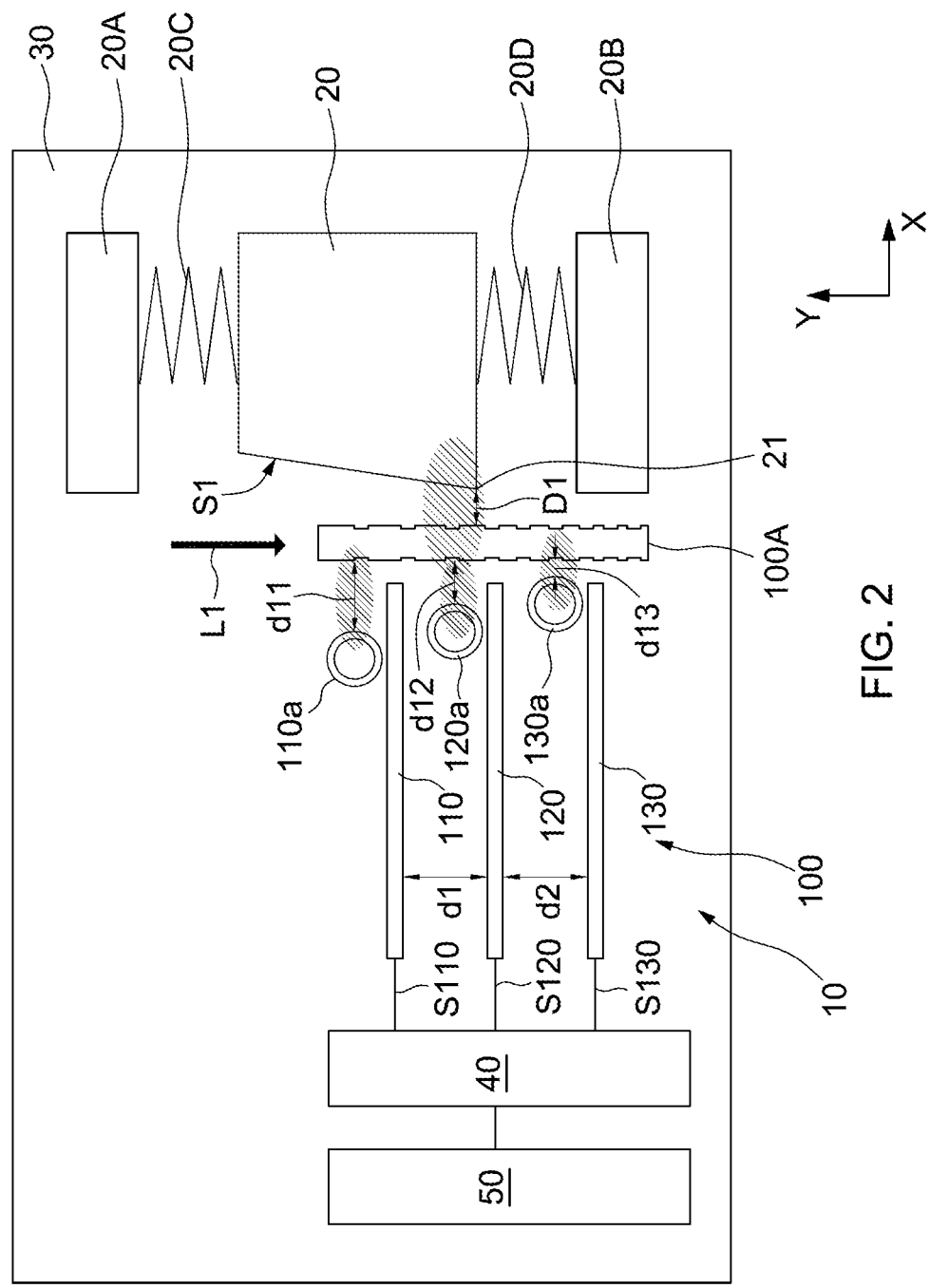
FIG. 2 is a schematic diagram of an electronic module in accordance with some arrangements of the present disclosure.

FIG. 2 is a schematic diagram of an electronic module 2 in accordance with some arrangements of the present disclosure. The electronic module 2 is similar to the electronic module 1 in FIG. 1, differing therefrom as follows. Descriptions of similar components are omitted.

In some arrangements, the waveguide 110 is configured to couple a portion (e.g., by an optical coupling L11) of the light L1 of a wavelength 1. For example, the waveguide 110 may be configured to couple a light beam of a wavelength 1.

In some arrangements, the waveguide 120 is configured to couple a portion (e.g., by an optical coupling L12) of the light L1 of the wavelength λ1. For example, the waveguide 120 may be configured to couple a light beam of the wavelength λ1. In some arrangements, the waveguides 110 and 120 are configured to couple light beams of the same wavelength.

In some arrangements, the waveguide 130 is configured to couple a portion (e.g., by an optical coupling L13) of the light L1 of the wavelength λ1. For example, the waveguide 130 may be configured to couple a light beam of the wavelength λ1. In some arrangements, the waveguides 110, 120, and 130 are configured to convey light beams of the same wavelength.

In some arrangements, the light L1 is a chromatic light, and the optical couplers 110a, 120a and 130a are configured to allow light beams of the same wavelength to be transmitted to the waveguides 110, 120, and 130. In some arrangements, distances between the optical bus 100A and the optical couplers 110a, 120a and 130a are different. For example, a distance d11 between the optical couplers 110a and the optical bus 100A, a distance d12 between the optical couplers 120a and the optical bus 100A, and d13 between the optical couplers 130a and the optical bus 100A are different. The different distances d1, d2 and d3 may create different levels of optical coupling efficiencies resulting from the evanescent field, and thereby providing different intensities for the optical signals S110, S120 and S130 transmitted from the different waveguides 110, 120 and 130 when an evanescent field is generated. Therefore, a characteristic pattern based on the optical signals S110, S120 and S130 may be generated for indicating the movement or acceleration of the movable component 20.

Figure 3A:
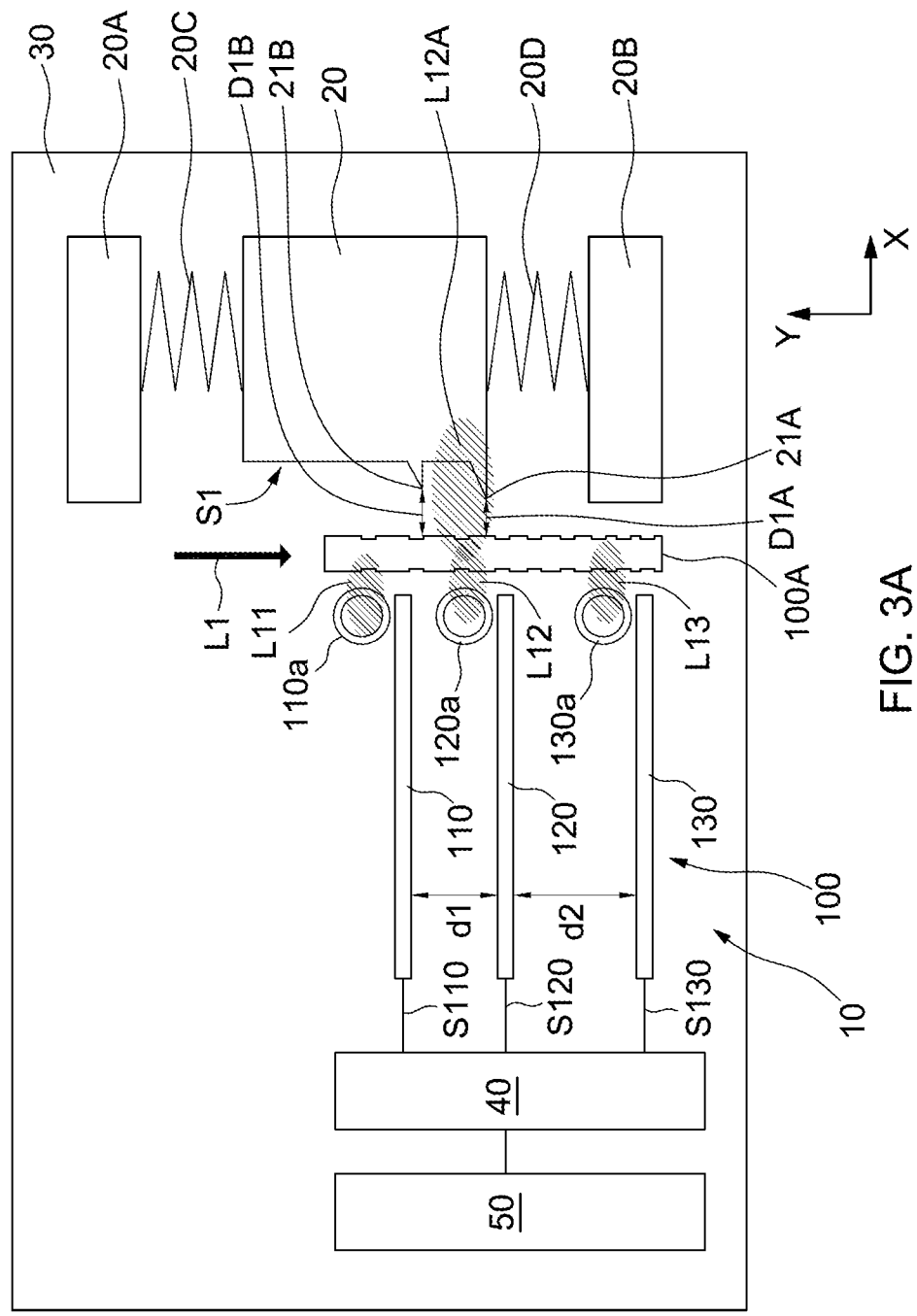
FIG. 3A is a schematic diagram of an electronic module in accordance with some arrangements of the present disclosure.

FIG. 3A is a schematic diagram of an electronic module 3A in accordance with some arrangements of the present disclosure. The electronic module 3A is similar to the electronic module 1 in FIG. 1, differing therefrom as follows. Descriptions of similar components are omitted.

In some arrangements, the movable component 20 may include a plurality of optical-component-proximal portions (e.g., optical-component-proximal portions 21A and 21B) on the side S1 (or the lateral surface) of the movable component 20. In some arrangements, the distances between the optical-component-proximal portions and the optical bus 100A may be different. For example, a distance MA between the optical-component-proximal portion 21A and the optical bus 100A is different from a distance D1B between the optical-component-proximal portion 21B and the optical bus 100A. The distance D1A and the distance D1B may result in optical couplings of light beams of different wavelengths. The distance MA and the distance D1B may be determined according to different predetermined wavelengths of light beams that couple the movable component 20, and thereby influence the optical signals transmitted from the waveguides to the receiving unit 40. Therefore, when an optical signal resulted from the evanescent field generated at the predetermined distance MA is close to a noise, another optical signal resulted from the evanescent field generated at the predetermined distance D1B may be used for determining the movement of the movable component 20.

Figure 3B:
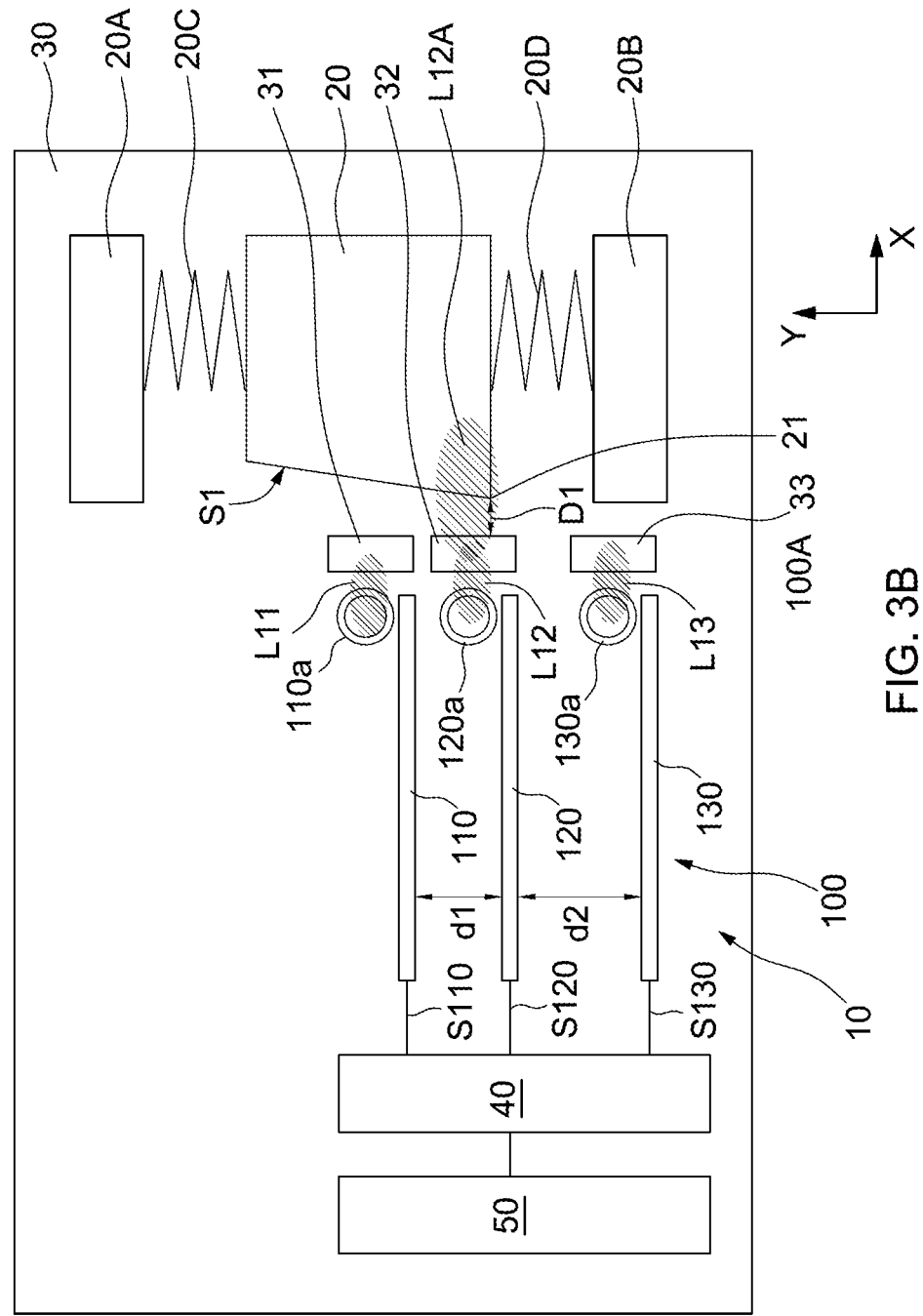
FIG. 3B is a schematic diagram of an electronic module in accordance with some arrangements of the present disclosure.

FIG. 3B is a schematic diagram of an electronic module 3B in accordance with some arrangements of the present disclosure. The electronic module 3B is similar to the electronic module 1 in FIG. 1, differing therefrom as follows. Descriptions of similar components are omitted.

In some arrangements, the electronic module 3B includes a plurality of light sources (e.g., light sources 31, 32, and 33) disposed on or in the carrier 30 and corresponding to a plurality of locations adjacent to the waveguides 110, 120, and 130. In some arrangements, the plurality of light sources may include a plurality of lighting elements or a plurality of lighting devices that are configured to generate and transmit a plurality of light beams to the plurality of locations adjacent to the waveguides 110, 120, and 130. Each of the light beams may couple each of the corresponding waveguides. For example, the light beam from the light source 31 may couple the waveguide 110, the light beam from the light source 32 may couple the waveguide 120, and the light beam from the light source 33 may couple the waveguide 130.

In some arrangements, the light beams generated by the light sources 31, 32 and 33 may have the same wavelength. In some arrangements, the light beams generated by the light sources 31, 32 and 33 may have different wavelengths. In some arrangements, each of the light sources 31, 32 and 33 may further include a waveguide extending from a lighting element to a location corresponding to one of the waveguides 110, 120, and 130. With the design of the light 31, 32 and 33, the uniformity of the light L1 transmitting towards the waveguides 110, 120, and 130 can be increased without the need for compensation by computing.

Figure 3C:
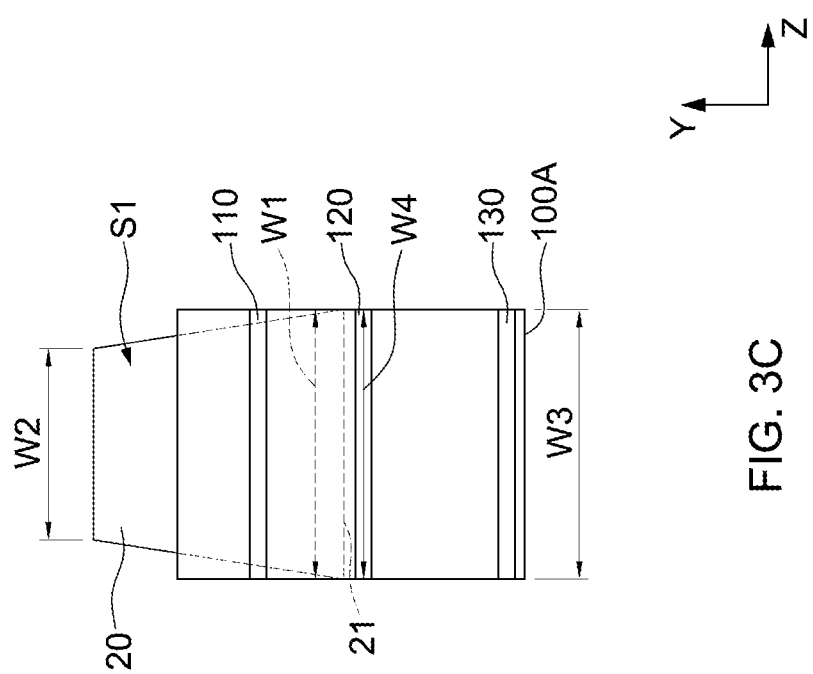
FIG. 3C is a schematic diagram of a portion of an electronic module in accordance with some arrangements of the present disclosure.

FIG. 3C is a schematic diagram of a portion of an electronic module 1 in accordance with some arrangements of the present disclosure. In some arrangements, FIG. 3C is a schematic diagram of the movable component 20, the optical bus 100A, and the waveguides 110, 120, and 130. In some arrangements, FIG. 3C is a schematic diagram of the movable component 20, the optical bus 100A, and the waveguides 110, 120, and 130 of the electronic module 1 illustrated in FIG. 1 as viewed along the direction DR1 (e.g., X axis).

In some arrangements, the optical-component-proximal portion 21 of the movable component 20 has a width W1 exceeding a width W2 of an edge of the side S1 (or the lateral surface) of the movable component 20. In some arrangements, the width W1 is from greater than about 2 nm to about 100 nm. In some arrangements, the width W2 is from about 2 nm to less than about 100 nm. In some arrangements, a width W3 of the optical bus 100A substantially equals or exceeds the width W1 of the optical-component-proximal portion 21 of the movable component 20. In some arrangements, the optical-component-proximal portion 21 having a relatively large width W1 can provide a relatively large overlapping area with the optical bus 100A, and an overlapping area between the optical bus 100A and the edge having the width W2 is relatively small. Therefore, the difference in the overlapping areas can further increase the difference in optical couplings between these two regions and the optical bus 100A, and thus the resolution of the optical signals for movement detection of the movable component 20.

In some arrangements, each of the waveguides 110, 120, and 130 has a width W4 substantially equaling the width W3 of the optical bus 100A. Therefore, the optical coupling efficiency can be optimized, and thus the resolution of the optical signals can be increased.

Figure 4:
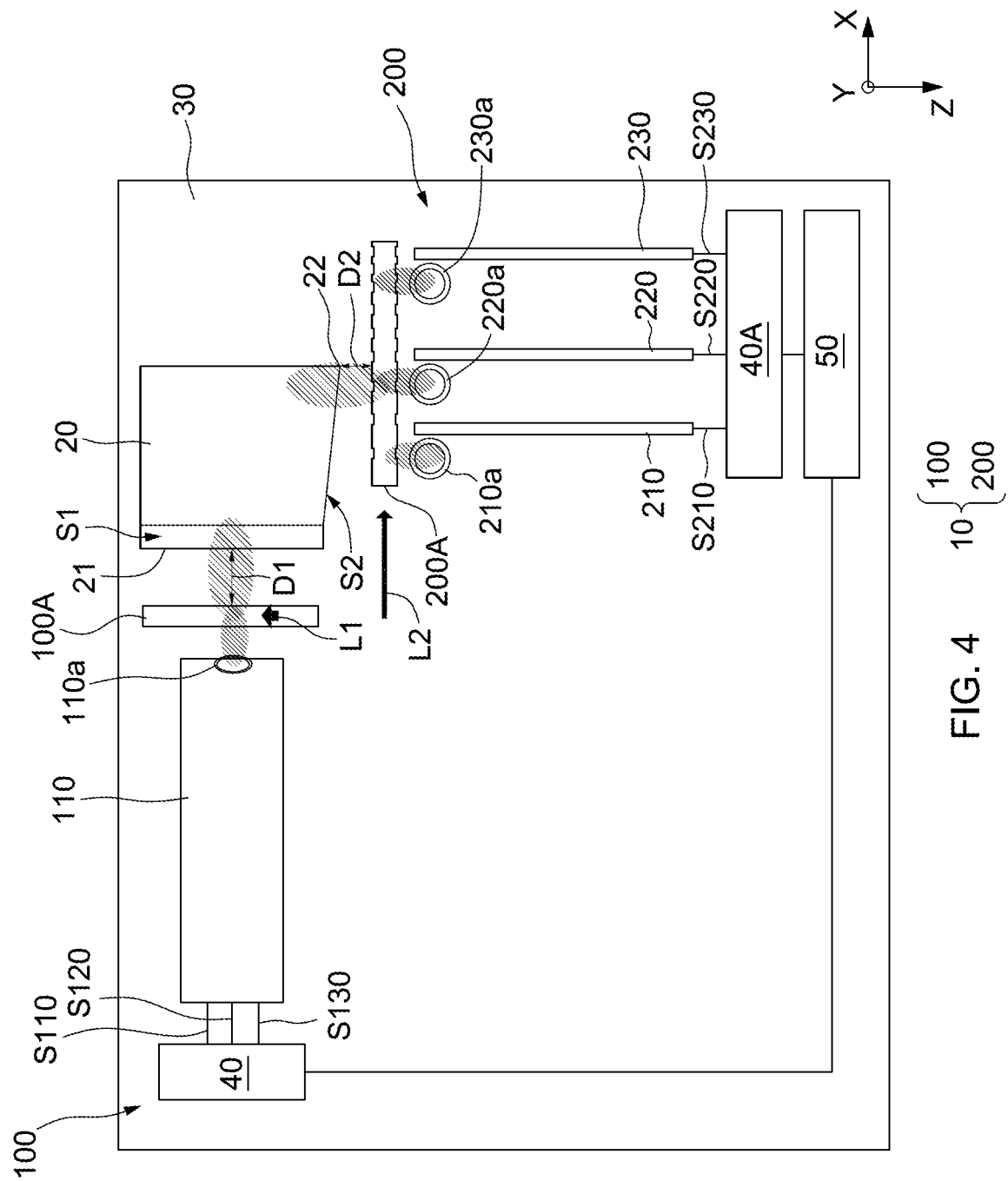
FIG. 4 is a schematic diagram of an electronic module in accordance with some arrangements of the present disclosure.

FIG. 4 is a schematic diagram of an electronic module 4 in accordance with some arrangements of the present disclosure. The electronic module 4 is similar to the electronic module 1 in FIG. 1, differing therefrom as follows. Descriptions of similar components are omitted.

In some arrangements, the optical module 10 includes optical components 100 and 200. In some arrangements, the optical component 200 is configured to detect a movement of the movable component 20 by an optical coupling between the optical component 200 and the movable component 20. In some arrangements, the optical component 200 is configured to split a light L2 into multiple light beams by, for example, an optical coupling between the optical component 200 and the movable component 20. In some arrangements, the optical component 200 is configured to detect a change in light intensity generated by the movement of the movable component 20.

The optical components 100 and 200 may receive the lights L1 and L2 from the same light source or different light sources. In some arrangements, the optical component 200 includes an optical bus 200A, a plurality of waveguides (e.g., waveguides 210, 220 and 230), and a plurality of optical couplers (e.g., optical couplers 210a, 220a and 230a). In some embodiments, the optical couplers may be or include micro-ring resonators. It should be noted that the number of the waveguides and the number of the optical couplers of the optical component 200 may vary according to actual application, and the present disclosure is not limited thereto. In addition, the optical bus 200A is the same as or similar to the optical bus 100A, the waveguides 210, 220 and 230 are the same as or similar to the waveguides 110, 120, and 130, and the optical couplers 210a, 220a and 230a are the same as or similar to the optical couplers 110a, 120a and 130a, and the description thereof is omitted accordingly.

In some arrangements, the optical bus 200A is disposed between the movable component 20 and the waveguides 210, 220 and 230. In some arrangements, an extending direction (e.g., X axis) of the optical bus 200A is substantially perpendicular to an extending direction (e.g., Z axis) of the waveguides 210, 220 and 230. In some arrangements, the optical bus 200A is disposed adjacent to a side S2 (or a lateral surface) of the movable component 20. In some arrangements, the side S2 is orthogonal to the side S1. In some arrangements, the optical bus 200A is fixed with respect to the carrier 30. In some arrangements, the optical bus 200A is configured to transmit the light L2. In some arrangements, the optical bus 200A is configured to couple the light L2 to the movable component 20 when the side S2 of the movable component 20 is separated from the optical bus 200A by a predetermined distance D2.

In some arrangements, the waveguides 210, 220 and 230 are disposed adjacent to the side S2 (or a lateral surface) of the movable component 20. In some arrangements, the waveguides 210, 220 and 230 are fixed with respect to the carrier 30. In some arrangements, the waveguides 210, 220 and 230 are arranged sequentially in a direction (e.g., X axis) substantially parallel to a moving direction (e.g., X axis) of the movable component 20. In some arrangements, the waveguides 210, 220 and 230 are arranged sequentially substantially perpendicular (e.g., X axis) to the direction (e.g., Y axis) along which the waveguides 110, 120, and 130 are arranged. In some arrangements, each of the optical couplers 210a, 220a and 230a is disposed between each of the waveguides 210, 220 and 230 and the optical bus 200A.

In some arrangements, the movable component 20 includes an optical-component-proximal portion 22 on the side S2 facing the optical bus 200A. The optical-component-proximal portion 22 may protrude from the side S2 (or the lateral surface) of the movable component 20. In some arrangements, the optical-component-proximal portion 22 is configured to couple the light L2 transmitted in the optical component 200. For example, the optical-component-proximal portion 22 may be configured to couple the light L2 transmitted in the optical bus 200A. In some arrangements, the optical-component-proximal portion 22 is separated from the optical bus 200A by the predetermined distance D2.

In some arrangements, the electronic module 4 includes a receiving unit 40A configured to receive optical signals S210, S220 and S230 from the waveguides 210, 220 and 230. In some arrangements, the processing unit 50 may be connected to the receiving units 40 and 40A. In some arrangements, the processing unit 50 is configured to generate a characteristic pattern based on the optical signals S210, S220 and S230 of the waveguides 110, 120, 130, 210, 220 and 230. In some arrangements, the characteristic pattern indicates the movement of the movable component 20. In some arrangements, the characteristic pattern generated from the optical signals S110, S120, S130, S210, S220, and S230 of the waveguides 110, 120, 130, 210, 220, and 230 indicates a two-dimensional movement of the movable component 20.

FIG. 5 is a schematic diagram of an electronic module 5 in accordance with some arrangements of the present disclosure. The electronic module 5 is similar to the electronic module 4 in FIG. 4, differing therefrom as follows. Descriptions of similar components are omitted.

In some arrangements, the optical module 10 includes optical components 100, 200, and 300. In some arrangements, the optical component 300 is configured to detect a movement of the movable component 20 by an optical coupling between the optical component 300 and the movable component 20. In some arrangements, the optical component 300 is configured to split a light L3 into multiple light beams by, for example, an optical coupling between the optical component 300 and the movable component 20. In some arrangements, the optical component 300 is configured to detect a change in light intensity generated by the movement of the movable component 20.

The optical components 100, 200 and 300 may receive lights L1, L2, and L3 from the same or different light sources. In some arrangements, the optical component 300 includes an optical bus 300A, a plurality of waveguides (e.g., waveguides 310, 320, and 330), and a plurality of optical couplers (e.g., optical couplers 310a, 320a and 330a). In some embodiments, the optical couplers may be or include micro-ring resonators. It should be noted that the number of the waveguides and the number of the optical couplers of the optical component 300 may vary according to actual application, and the present disclosure is not limited thereto. In addition, the optical bus 300A is the same as or similar to the optical bus 100A, the waveguides 310, 320, and 330 are the same as or similar to the waveguides 110, 120, and 130, and the optical couplers 310a, 320a and 330a are the same as or similar to the optical couplers 110a, 120a and 130a, and description thereof is omitted.

In some arrangements, the optical bus 300A is disposed between the movable component 20 and the waveguides 310, 320, and 330. In some arrangements, an extending direction (e.g., Z axis) of the optical bus 300A is substantially perpendicular to an extending direction (e.g., X axis) of the waveguides 310, 320, and 330. In some arrangements, the optical bus 300A is disposed adjacent to a side S3 (or a lateral surface) of the movable component 20. In some arrangements, the side S3 is orthogonal to the side S1 and the side S2. In some arrangements, the optical bus 300A is fixed with respect to the carrier 30. In some arrangements, the optical bus 300A is configured to transmit the light L3. In some arrangements, the optical bus 300A is configured to couple the light L3 to the movable component 20 when the side S3 of the movable component 20 is separated from the optical bus 300A by a predetermined distance D3.

In some arrangements, the waveguides 310, 320, and 330 are disposed adjacent to the side S3 (or a lateral surface) of the movable component 20. In some arrangements, the waveguides 310, 320, and 330 are fixed with respect to the carrier 30. In some arrangements, the waveguides 310, 320, and 330 are arranged sequentially along a direction (e.g., Z axis) substantially parallel to a moving direction (e.g., Z axis) of the movable component 20. In some arrangements, the waveguides 310, 320, and 330 are arranged sequentially along a direction (e.g., Z axis) substantially perpendicular to the direction (e.g., Y axis) along which the waveguides 110, 120, and 130 are arranged. In some arrangements, each of the optical couplers 310a, 320a and 330a is disposed between each of the waveguides 310, 320, and 330 and the optical bus 300A.

In some arrangements, the movable component 20 includes an optical-component-proximal portion 23 on the side S3 facing the optical bus 300A. The optical-component-proximal portion 23 may protrude from the side S3 (or the lateral surface) of the movable component 20. In some arrangements, the optical-component-proximal portion 23 is configured to couple the light L3 transmitted in the optical component 300. For example, the optical-component-proximal portion 23 may be configured to couple the light L3 transmitted in the optical bus 300A. In some arrangements, the optical-component-proximal portion 23 is separated from the optical bus 300A by the predetermined distance D3.

In some arrangements, the side S1 of the movable component 20 is opposite to the side S3 of the movable component 20, and the side S2 is between the side S1 and the side S3 of the movable component 20. In some arrangements, the waveguides 310, 320, and 330 are arranged sequentially along a direction (e.g., Z axis) substantially perpendicular to the direction (e.g., X axis) along which the waveguides 210, 220 and 230 are arranged. In some arrangements, the waveguides 110, 120, and 130 are arranged sequentially along a first direction (e.g., Y axis), the waveguides 210, 220 and 230 are arranged sequentially along a second direction (e.g., X axis), the waveguides 310, 320, and 330 are arranged sequentially along a third direction (e.g., Z axis), wherein the first direction, the second direction, and the third direction are orthogonal.

In some arrangements, the electronic module 5 includes a receiving unit 40B configured to receive optical signals S310, S320, and S330 from the waveguides 310, 320, and 330. In some arrangements, the processing unit 50 may be connected to the receiving units 40, 40A, and 40B. In some arrangements, the processing unit 50 is configured to generate a characteristic pattern based on the optical signals S110, S120, S130, S210, S220, S230, S310, S320, and S330 of the waveguides 110, 120, 130, 210, 220, 230, 310, 320, and 330. In some arrangements, the characteristic pattern indicates the movement of the movable component 20. In some arrangements, the characteristic pattern generated from the optical signals S110, S120, S130, S210, S220, S230, S310, S320, and S330 of the waveguides 110, 120, 130, 210, 220, 230, 310, 320, and 330 indicates a three-dimensional movement of the movable component 20.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of said numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" or "about" the same if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" parallel can refer to a range of angular variation relative to 0° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°. For example, "substantially" perpendicular can refer to a range of angular variation relative to 90° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Two surfaces can be deemed to be coplanar or substantially coplanar if a displacement between the two surfaces is no greater than 5 μm, no greater than 2 μm, no greater than 1 μm, or no greater than 0.5 μm.

As used herein, the terms "conductive," "electrically conductive" and "electrical conductivity" refer to an ability to transport an electric current. Electrically conductive materials typically indicate those materials that exhibit little or no opposition to the flow of an electric current. One measure of electrical conductivity is Siemens per meter (S/m). Typically, an electrically conductive material is one having a conductivity greater than approximately $10^4$ S/m, such as at least $10^5$ S/m or at least $10^6$ S/m. The electrical conductivity of a material can sometimes vary with temperature. Unless otherwise specified, the electrical conductivity of a material is measured at room temperature.

As used herein, the singular terms "a," "an," and "the" may include plural referents unless the context clearly dictates otherwise. In the description of some arrangements, a component provided "on" or "over" another component can encompass cases where the former component is directly on (e.g., in physical contact with) the latter component, as well as cases where one or more intervening components are located between the former component and the latter component. In the description of some arrangements, a component provided "under" or "below" another component can encompass cases where the former component is directly below (e.g., in physical contact with) the latter component, as well as cases where one or more intervening components are located between the former component and the latter component.

While the present disclosure has been described and illustrated with reference to specific arrangements thereof, these descriptions and illustrations do not limit the present disclosure. It can be clearly understood by those skilled in the art that various changes may be made, and equivalent components may be substituted within the arrangements without departing from the true spirit and scope of the present disclosure as defined by the appended claims. The illustrations may not necessarily be drawn to scale. There may be distinctions between the artistic renditions in the present disclosure and the actual apparatus, due to variables in manufacturing processes and the like. There may be other arrangements of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it can be understood that these operations may be combined, sub-divided, or re-ordered to form an equivalent method without departing from the teachings of the present disclosure. Therefore, unless specifically indicated herein, the order and grouping of the operations are not limitations of the present disclosure.

What is claimed is:

1. An electronic module, comprising:
   a movable component;
   a plurality of waveguides disposed adjacent to the movable component; and
   an optical bus between the plurality of waveguides and the movable component, and configured to couple a light to the movable component when the movable component is separated from the optical bus by a predetermined distance,
   wherein the plurality of waveguides are arranged sequentially along a first direction substantially parallel to a moving direction of the movable component, and
   wherein the plurality of waveguides comprise a first waveguide, a second waveguide, and a third waveguide arranged sequentially along the first direction, wherein a distance between the first waveguide and the second waveguide is different from a distance between the second waveguide and the third waveguide.

2. The electronic module of claim 1, further comprising a plurality of optical couplers respectively disposed between each of the plurality of waveguides and the optical bus.

3. The electronic module of claim 2, wherein each of the optical couplers is configured to allow a light beam of a predetermined wavelength to be transmitted to each corresponding waveguide of the plurality of waveguides.

4. The electronic module of claim 1, wherein the movable component is configured to be movable with respect to a carrier, or the waveguides.

5. An electronic module, comprising:
   a movable component attached to a carrier and configured to be movable with respect to the carrier;
   a first plurality of waveguides disposed adjacent to a first side of the movable component, wherein the first plurality of waveguides are arranged sequentially along a first direction substantially parallel to a first moving direction of the movable component;
   a first optical bus configured to couple a first light to the movable component when the first side of the movable component is separated from the first optical bus by a first predetermined distance;
   a second plurality of waveguides disposed adjacent to a second side of the movable component, wherein the second side is orthogonal to the first side; and
   a second optical bus configured to couple a second light to the movable component when the second side of the movable component is separated from the second optical bus by a second predetermined distance.

6. The electronic module of claim 5, wherein the second plurality of waveguides are arranged sequentially along a second direction substantially parallel to a second moving direction of the movable component.

7. The electronic module of claim 5, further comprising:
   at least one receiving unit configured to receive optical signals from the first plurality of waveguides or the second plurality of waveguides; and
   a processing unit connected to the at least one receiving unit and configured to generate a characteristic pattern based on the optical signals of the first plurality of waveguides or the second plurality of waveguides, the characteristic pattern indicating a movement of the movable component.

\* \* \* \* \*